United States Patent [19]
Barcelou

[11] Patent Number: 6,048,271
[45] Date of Patent: *Apr. 11, 2000

[54] AUTOMATED LEAGUE AND TOURNAMENT DEVICE

[76] Inventor: David M. Barcelou, 123 Lambertville-Hopewell Rd., Hopewell, N.J. 08525

[ * ] Notice: This patent issued on a continued prosecution application filed under 37 CFR 1.53(d), and is subject to the twenty year patent term provisions of 35 U.S.C. 154(a)(2).

[21] Appl. No.: 08/643,827

[22] Filed: May 7, 1996

[51] Int. Cl.[7] ........................................................ A63F 9/24
[52] U.S. Cl. .................................. 463/48; 463/25; 463/46
[58] Field of Search ............................... 463/4, 7, 25, 29, 463/40, 42, 46, 48, 16; 235/379, 380, 381; 902/23; 700/90, 91

[56] References Cited

U.S. PATENT DOCUMENTS

| | | | |
|---|---|---|---|
| 4,593,904 | 6/1986 | Graves | 273/1 E |
| 4,669,730 | 6/1987 | Small | 463/25 |
| 4,926,327 | 5/1990 | Sidley | 463/42 |
| 5,083,271 | 1/1992 | Thacher et al. | 463/42 |
| 5,114,155 | 5/1992 | Tillery et al. | 463/42 |
| 5,429,361 | 7/1995 | Raven et al. | 463/29 |
| 5,513,117 | 4/1996 | Small | 235/381 |
| 5,546,523 | 8/1996 | Gatto | 235/380 |
| 5,593,349 | 1/1997 | Miguel et al. | 463/1 |
| 5,643,088 | 7/1997 | Vaughn et al. | 463/40 |
| 5,816,918 | 10/1998 | Kelly et al. | 463/16 |
| 5,902,983 | 5/1999 | Crevelt et al. | 235/380 |
| 5,919,091 | 7/1999 | Bell et al. | 463/25 |

*Primary Examiner*—Jessica J. Harrison
*Attorney, Agent, or Firm*—Webb Ziesenheim Logsdon Orkin & Hanson, P.C.

[57] ABSTRACT

A sport or skill game device in which equipment for accepting and dispensing currency, preferably of more than one type (both actual cash and encodable credit, for example), is provided in close proximity with and in electronic connection to one or more of any of a number of sport or skill game devices for play by two or more players. The device contains a computerized function (and appropriate hardware and software) so that the outcome of at least one game of skill may be decided among two or more entrants whose entry fees and currency payouts (to the winners) are tendered and distributed as part of the overall operation of the device.

13 Claims, 8 Drawing Sheets

AUTOMATED LEAGUE AND TOURNAMENT DEVICE

FIELD OF THE INVENTION

The invention adapts multiple aspects of entertainment technology and other technologies to sport and skill games and/or devices.

BACKGROUND OF THE INVENTION

Entertainment technology has evolved beyond recognition in a mere ten or fifteen years. New motion pictures are released into complicated and ever more calculated schemes of sequential availability to commercial theaters, rental operations and home theaters—the latter of which can bear startling resemblance to the former. Audio recordings known as "enhanced CDS" offer not only audio but multimedia video replication, and personal computers and televisions and their networks are individually evolving so that soon they may well be virtually indistinguishable. A wide array of online information and interaction tempts us, moreover, from opportunities as unsophisticated as the online equivalent of a group of teenagers sharing a party telephone line to those inherent in ineffable data banks pertaining to satellite photography, medicine and genetic engineering, just to name a few.

Beneath the most enhanced entertainment technology lies a troubling and largely unrecognized assumption, however. With some but minor exceptions, cutting edge entertainment technology is predicated upon the belief that its consumers prefer a largely passive role while the technological dazzle occupies the stage. Multimedia CD jukeboxes are a good example of this phenomenon—a pub or restaurant in which such a machine is installed is overtaken by a genial Wizard of Oz in which social activities, other than the tendering of adequate currency to the welcome sorcerer, take on secondary importance.

This is not to say that the entertainment industry requires passive participation—quite the contrary—just that the concomitant technology generally does. For example, the Karaoke machine in which prerecorded (or sequenced) orchestrations may be augmented by live vocals is at this writing barely taken seriously as an embodiment of entertainment technology, and customarily it is subjected to lighthearted scorn. Even with the newest theme park amusements the "ride" is generally passive. "Hot buttons" on click screens or touchscreens in multimedia interactive applications never seem to deliver the promised autonomy and volition with which such systems entice new users. On the other hand, where true active entertainment participation is maximized the technology tends to be minimal at this writing, such as is evident from the undying popularity of traditional pool or pinball competitions, or in electronic darts and their leagues, or old fashioned amusement park autobahns where the driver can actually (heavens!) steer the car. Consumers of up-to-the-minute elaborate entertainment technology are not today supposed to impose themselves too visibly, or too actively, into the mechanations of their experience.

Quite apart from the entertainment technology industries, sport and skill game leagues of all kinds are gaining in popularity in various settings. The aforementioned electronic darts leagues are immensely popular across a wide socioeconomic spectrum, and other games of skill organized into fee-for-entry leagues include but are not limited to chess, bowling, pool, miniature soccer, miniature hockey, and pinball and video games of skill. These leagues are operated separately from legal and less-than-legal gambling channels, such as those having to do with video poker, because the leagues sponsor games of skill only and proceeds are thus not distributed on the basis of chance. These leagues tend to be surprisingly conventional in their organization, solicitation, seasonal entry, execution and end-of season payout, possibly because the same individuals who value active participation in their leisure pursuits likewise tend to take an active role in the hands-on administration of traditionally organized amusement game and sports leagues.

Accordingly, a need remains for an improvement in entertainment technology in which some or all aspects of that technology, as well as other technologies, are redesigned directly to embrace participatory activities such as those of a sport or skill game league rather than merely the passive participation typical of entertainment technology heretofore.

SUMMARY OF THE INVENTION

In order to meet this need, the present invention is a sport or skill game device in which an amalgam of various technologies cooperate to facilitate an active sport or skill game between two players or among three or more players, usually organized into leagues. The device necessarily includes equipment for accepting and dispensing currency, preferably of more than one type (both actual cash and digital cash in the form of encodable credit, for example), in close proximity with and in electronic connection to one or more of any of a number of sport or skill game devices such as may be used for electronic darts, minature hockey, chess, miniature bowling, pinball, video games of skill or virtually any other game of skill in either full sized or miniaturized versions. Preferably, the device includes multimedia enhancements such as controllably cheering crowds and context specific video displays. Moreover, the device necessarily contains a computerized function (and appropriate hardware and software) so that the outcome of at least one game of skill may be decided among 2 or more entrants whose entry fees and currency payouts (to the winners) are tendered and distributed as part of the overall operation of the device.

The device may occupy a single location, with equipment to allow play by two or more players, or may embody a network of individual game kiosks under centralized control. The device may offer additional optional services including, but not limited to, jukebox activation, full automated teller function, vending of various retail goods and services such as mail order catalogue purchases, sporting and cultural event tickets, cruise or airline tickets, dating services, stock trading or other investment services or even direct vending of foods, beverages, publications, esoterica, etc.

DETAILED DESCRIPTION OF THE INVENTION

The present invention is a sport or skill game device in which an amalgam of various technologies cooperate to solicit, to organize and to administer an active sport or skill game between two players or among three or more players, with larger numbers usually being organized into leagues. The device may occupy a single location, with equipment to allow play by two or more players, or may embody a network of individual games under centralized control.

The inventive sports league device necessarily includes equipment for accepting and dispensing currency, preferably of more than one type (both actual cash and at least one form of digital currency such as encodable credit, for example), in close proximity with and in electronic connection to any of a number of sport or skill game devices such as may be used for electronic darts, miniature hockey, chess, miniature bowling, pinball, video games of skill or virtually any other game of skill in either full sized or miniaturized versions. Preferably, the device includes multimedia enhancements such as controllably cheering crowds and pertinent video displays. Moreover, the device necessarily contains a computerized function (and appropriate hardware and software) so that the outcome of at least one game of skill may be decided among two or more entrants whose entry fees and currency payouts (to the winners) are tendered and distributed as part of the overall operation of the device.

The device may offer additional optional services including, but not limited to, jukebox activation, full automated teller function, direct vending of foods, beverages, publications and other retail items or remote vending of various retail goods and services such as mail order catalogue purchases or restaurant take-out orders, online service access, sporting and cultural event tickets, cruise or airline tickets, telephone or other smart card encoding, dating services, stock trading or other investment or banking services, health assessment and treatment services, pharmacy services including drug interaction databases, government benefits administration such as food stamps or Medicaid, or insurance brokerage. Other services are limited only by the imagination.

Figure 1:
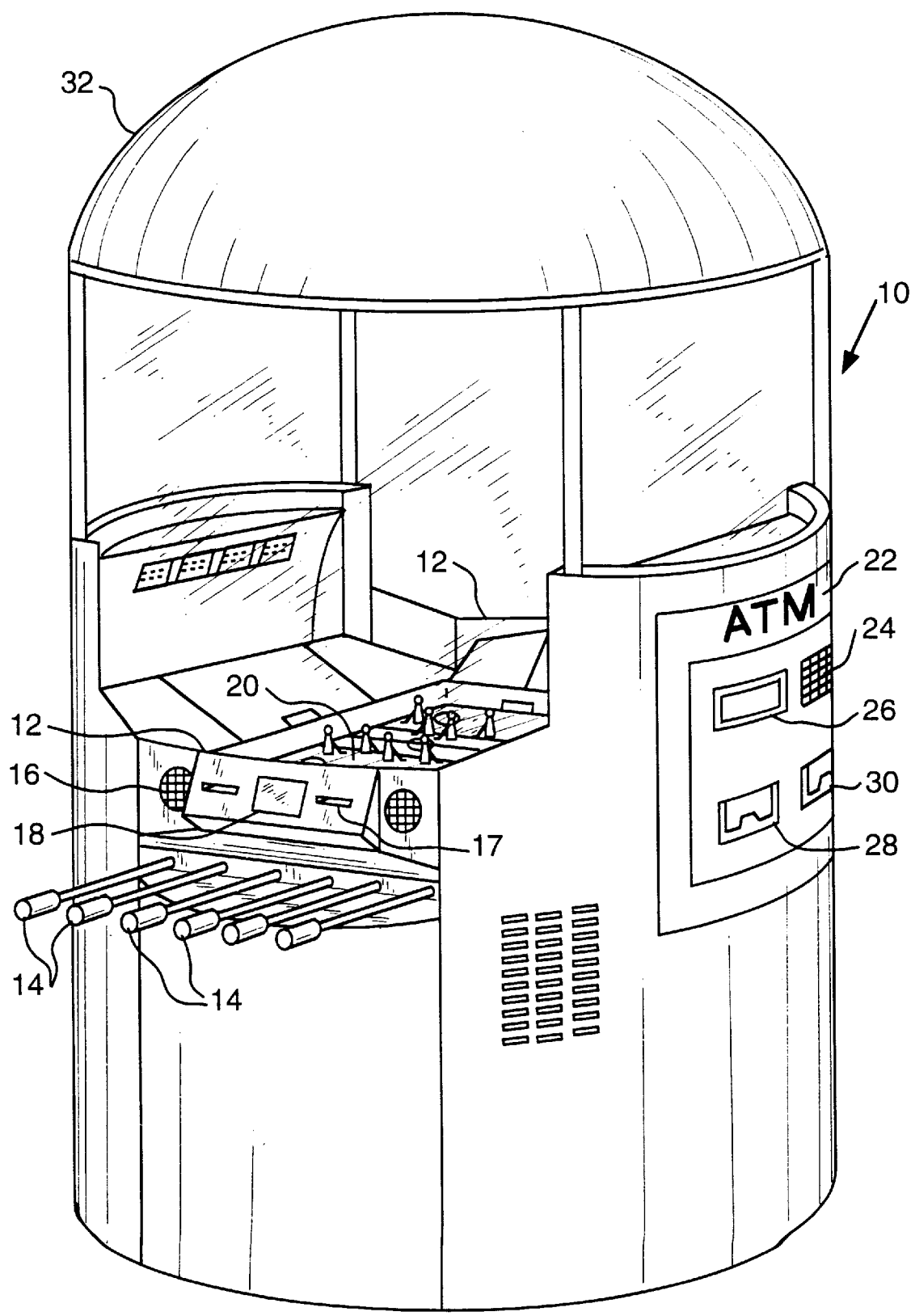
FIG. 1 is a perspective view of a first embodiment of the invention.

By convention throughout this specification, the "device" refers to the sport or skill game system as a whole, notwithstanding the varying nature of the device as an individual kiosk, such as is shown in FIG. 1, or local area networks or wide area networks for multiple station league play with or without the additional functions of retail kiosks for direct or remote vending. The invention and the device, for the purposes of this specification, are thus synonymous.

The present device is used to solicit, to enroll, to govern play and to pay the winner of any one or more of a number of games of skill. A description of the details of how to govern games between two people or league tournament competitions is largely omitted here, because the underlying administrative procedures are both well known and variable regarding aspects such as entry fees, playoff progression and other aspects of tournament administration. However, the present device preferably includes equipment to allow for one or more of the following entertainment technology enhancements to tournament play, including but not limited to:

a) sound and/or motion sensors to initiate attract mode displays on device video display(s) and from audio speakers;

b) audio as well as video instructions and menus;

c) game command interactive touchscreen which also commands selective cheers or taunts from built in speakers, or the national anthem at the start of play, or other light or sound enhancements of game play;

d) juke box provision with operation both independent of and/or interrelated to game play;

e) portrait camera(s) for encoding digital portraits inserted either on players' individual smart cards or as a means of access to a pictorial database;

f) real time video telephone and/or video broadcasting connections between and among local or wide area players or other video networks; printouts of discount coupons, award certificates, player statistics and/or game or tournament results and/or coming tournaments and attractions and schedules.

Enhancements beyond entertainment technology per se have already been listed and include ticket services, dating services, etc. as options. However, the following list helps to illustrate the wide variety of services which can be included: E-M Games of Skill Services; Smart Card Services; Insurance Services; Restaurant Services; Travel Services; Sports Services; Gaming Device Services; Delivery Services; Coupon Services; Introduction Services; Audio Services; News Services; Transportation Services; Utility Services; Physician Services; School Services; Security Services; Building Services; Credit Services; Directory Services; Home Services; Military Services; Personal Services; Automotive Services; Employment Services; Recreational Services; Travelers Check Services; Kids Services; Videogames of Skill Services; Internet Services; Brokerage Services; Government Services; Entertainment Services; Library Services; Catalog Services; Print Services; Diagnostic Services; Chat Services; Video Services; Database Services; Barter Services; Engineering Services; Pharmacy Services; Identification Services; Detective Services; Church Services; Loan Services; Training Services; Buying Services; Recruitment Services; Accounting Services; Photographic Services; Food Services; Radio Services; Credit Services; Theme Park Services; Music Services; Financial Services; Full-line Vending Services; Health Care Services; Remote Access Services; Payment Services; Computer Services; Search Services; Network Services; Subscription Services; Virtual Reality Services; Advertising Services; Rental Services; Programming Services; Beverage Services; Credit/Debit Card Services; Freight Services; Stored Value Card Services; Beauty Services; Tax Services; Leasing Services; Medical Services; Emergency Services; Publishing Services; Counseling Services; Satellite Services; Screening Services; Real Estate Services; Telephone Services; Ticket Services; Television Services; Dating Services; Information Services; Lottery Services; Software Services; Reservation Services; Communication Services; Intranet Services; Adult Services; Referral Services; Repair Services; Legal Services; Consulting Services; Maintenance Services; Moving Services; Trade Show Services; Design Services; Lodging Services; Mail Services; Fast Food Services; Automated Services; Recording Services; Clothing Services; Wireless Services; Human Services; and Encryption Services.

In a manner similar to the known nature of the league administrative organization, software systems capable of coordinating the combined functions of the present invention are within the skill of the art and do not form a central part of the invention, nor actually do specific video displays and interactive protocols associated therewith (apart from independent proprietary design). For example, the Remote Procedure Call (RPC) model is an industry wide, well tested technology enabling the design and implementation of distributed applications such as the multi-vendor interoperability intrinsic to the present device. The RPC service enables the local game or sport player to invoke a remote procedure as if it were local to the calling process (a remote procedure is a procedure located in an address space separate from the calling code). Ordinarily, the present device will be coordinated according to the RPC model, generally using TCP/IP support protocol computerized systems and known smart card encoding/decoding, database, directory, currency transfer, alternative error recovery and security systems in Local Area Network (LAN), frequently in conjunction with Wide Area Network (WAN), configurations. The invention inheres in the novel interactive combination of several separate technologies as described above, and not in the specifics of the man-machine interface protocols which govern either individual transactions or the overall device.

The above generalized disclosure of the invention is illustrated further by means of the six embodiments specifically illustrated in FIGS. 1–8, which embodiments are not exhaustive of the various ways the present invention may be implemented.

Referring now to FIG. 1, a kiosk 10 is shown in perspective in which two play stations 12 are fitted with play controls 14, a smart card reader/encoder 16, a credit card reader 17, and a video command touchscreen 18. Play controls 14 govern play on a playing field 20 (the playing field itself is shown in greater detail in FIG. 6, below), and scoring is automatically calculated and communicated to a computerized control (not shown) interior to and/or exterior to the kiosk 10. The computerized control connects directly to the smart card reader/encoder 16, the credit card reader 17 and the video command screen 18. On a side of the kiosk 10 generally normal to the two play stations 12, an automated teller machine (ATM) 22 includes typical ATM hardware including a card reader (not shown), keyboard 24, instruction screen 26, bill dispenser 28 and receipt dispenser 30. The playing field 20 is covered by and protected by a penetration resistant dome 32 and a standard ATM/bank security camera 31.

In operation, the kiosk of FIG. 1 contains all the hardware necessary to enable a player to stand in front of the play station 12, to place a credit card in the credit card reader 17, and to vend or to add value to a smart card (not shown) via the video command touchscreen and the smart card reader/encoder 16. By continuing to use the video command touchscreen, the player may initiate play of a game of skill embodied in the kiosk with another player (either real or virtual), usually after paying an entry fee. Electronic sensors within the kiosk connected with the accompanying computerized control determine the winner of the game of skill and winner identity can be confirmed via the video command touchscreen. Payout of any cash prize owing to the winner can be directed by the computerized control by encoding a credit on the smart card with which game entry was effected, and at the same time the computerized control may also encode player game statistics on the smart card as well. The winner of the game may then insert his smart card through the card reader of the ATM for the purpose of transacting immediate cash disbursement or, alternatively, may deposit his winnings to an existing bank account or make any other electronic credit transaction he or she wishes—including leaving the winnings on the smart card for payment of further entry fees or other retail transactions.

The above exemplary configuration is subject to wide variation, particularly with respect to the smart card reader/encoder 16 and the credit card reader 17. In modified embodiments these structures may be combined as multifunctional smart card/credit card readers and/or a bill acceptor may be added or substituted.

An important aspect of the present invention is the provision of a game of skill to two or more players. For the purposes of the invention, a "player" may be a computer program capable of operating in lieu of a live player, so that for example a single player using the kiosk of FIG. 1 could be given the option, via his touchscreen, of playing a computerized opponent. The opponent may even be mechanical, such as in the cyclical rotation of moving targets in a shooting match game of skill. The provision of the option of a computerized or mechanized opponent does not, however, convert a game of skill to a game of chance (viz. computerized chess opponents who invoke very real chess skills). This is an important distinction to arguable games of skill which are really games of chance, such as video solitaire or other games in which the skill required is primarily that of marshaling the chance or random element. Ordinarily, the skill games and sports contemplated for incorporation in the present device are those which require skills of either eye-hand or eye-motor coordination and/or the intellectual skills necessary to answer or to solve problems of science, trivia or war strategy. Skill games well suited to inclusion within the present device are mechanical hockey, chess, video football and others, whereas games substantially governed by die-rolling or card dealing (and their virtual equivalents) are not what is generally meant by "game of skill."

The separate use of a smart card, first at a play station and later (in the event of winning) at an ATM is not strictly speaking a necessary feature of the present invention—although it can be an extremely practical one. Kiosks such as are shown in FIG. 1 will be welcomed in places where heretofore neither fully automated league devices nor ATMs have traditionally been available, such as pubs and bars, restaurants, public waiting areas, game arcades and amusement parks. Anticipated high usage of the kiosks suggests that some individuals will form a queue to use the ATM even while other individuals are using the play stations, so that direct credit of winnings to the player's smart card can be more secure than would an automatic payout to the adjacent ATM—which someone else other than the winner might be using at the time.

In the most preferred embodiment of the invention, the smart card has a greater processing and/or memory capacity than can be encoded in mere bar codes or magnetic stripes, as a result of inclusion of processors and/or computer chips therein. Such "smartest" cards can keep track of the owner's usage—game handicap, statistics and scores, for example. Music preferences and other menus can be stored in such cards.

That said, however, the smart card is not strictly essential to the present invention. The first embodiment of the invention as described in reference to FIG. 1 is shown in the schematic diagram of FIG. 2a, but FIG. 2b illustrates that the smart card itself, as well as the smart card reader/encoder, may be eliminated from the present invention. If smart cards are not used at all, the control function of the present device merely directs payout, to the winner, via the adjacent currency acceptor/disburser. As shown in FIG. 2b, players may pay their entry fees to the cash acceptor/disburser and proceed to play at stations 1 and 2, which are in two-way communication with a control (usually computerized), whereupon the control determines the winner and directs payment to the currency acceptor/disburser. FIG. 2b shows an optional two-way communication between the play station and the currency acceptor/disburser, to permit the player to control the timing of actual disbursement of the winnings ("Are you ready to receive cash payout now? Y/N," for example).

Figure 2A:
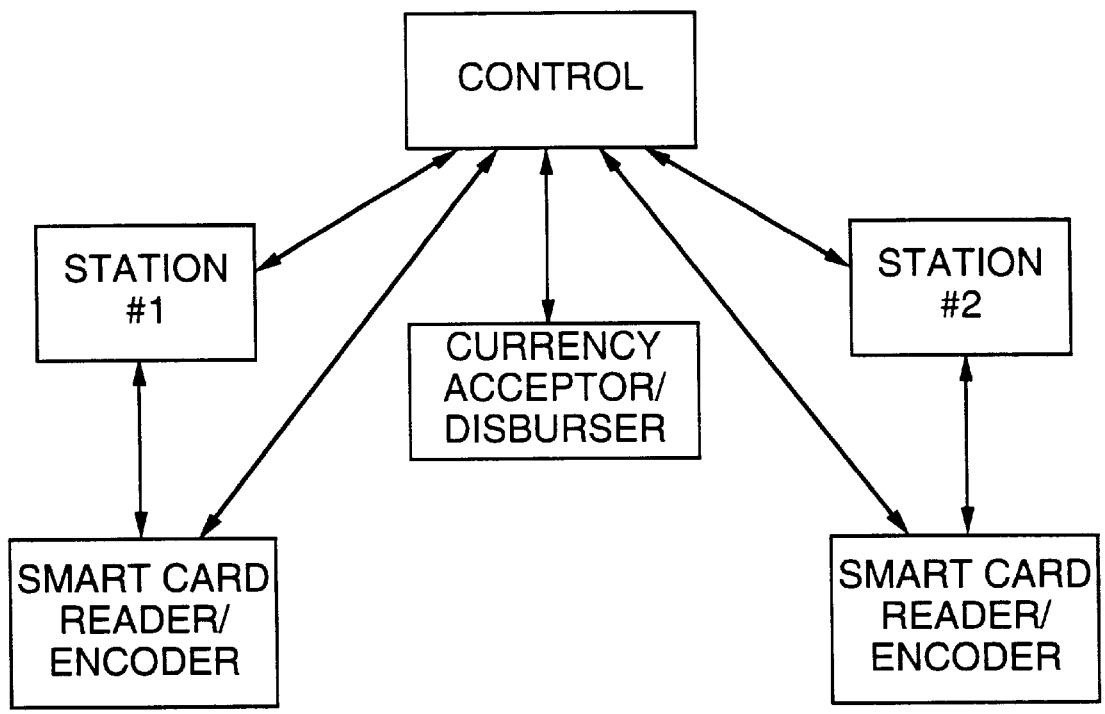
FIGS. 2a and 2b are schematic diagrams showing the elements of the first embodiment and a second embodiment of the invention.
Figure 2B:
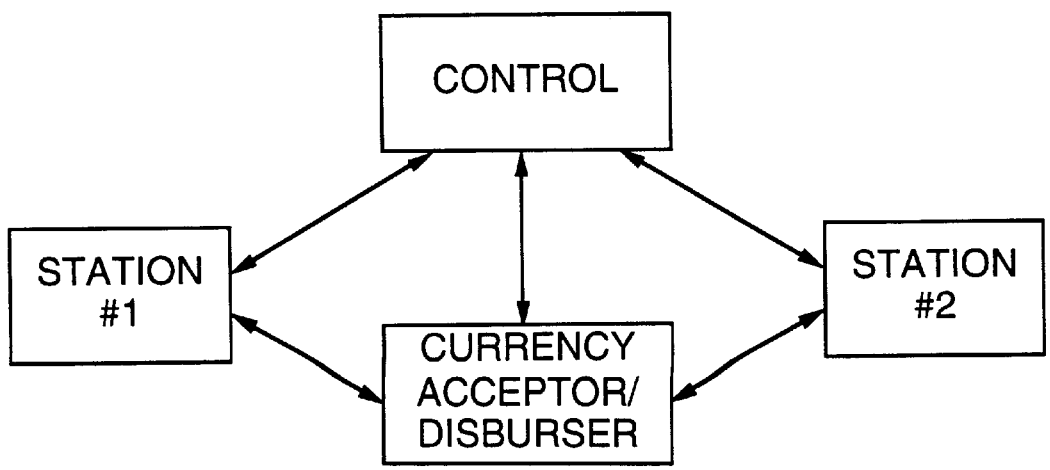

FIG. 2a shows in schematic diagram the invention substantially as described with reference to FIG. 1. A device containing two play stations also contains a currency acceptor/disburser, all of which are in two-way communication with a control (usually computerized). Each play station is in two-way communication with a smart card reader/encoder, which may include credit card reading capability. After the players pay their entry fees (either by credit card via the smart card reader/encoder or at the currency acceptor/disburser) and play the game of skill or sport, the control may judge the contest and direct payout to the winner directly to the winner's smart card, via the smart card reader/encoder, after which the player may then use his smart card in a separate transaction at the currency acceptor/disburser. The arrangement of FIG. 2a does allow for the possibility that the control means may direct immediate payout via the currency acceptor/disburser, but FIG. 2a does not illustrate the player's option of mediating that payout directly, without going through the control.

Notwithstanding the above, it is entirely possible to combine individual smart card usage and multistation ATM ports and still fall within the scope of the present invention. For example, a player using a smart card could still direct cash disbursement to be made immediately adjacent his play station, if the device is configured to offer cash disbursement in this way. This possibility is discussed further below, in the section which describes FIGS. 4 and 5. Smart cards may also be encoded with digital portraits of individual players as well as one or more currency accounts and player statistics and/or handicap, as well as current tournament standing if applicable.

Figure 3:
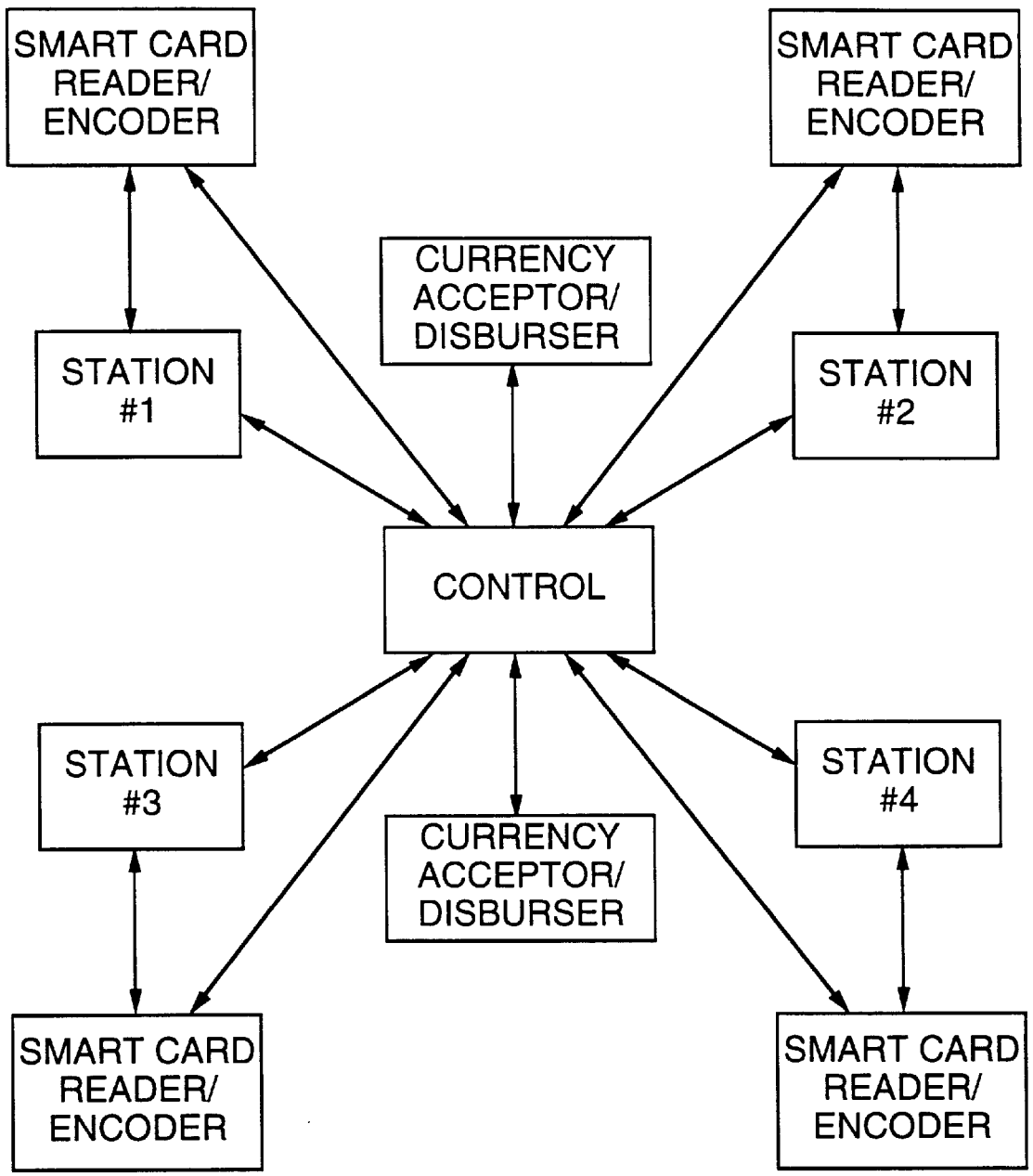
FIG. 3 is a schematic diagram of a third embodiment of the invention.

A more elaborate, third embodiment of the invention is shown in FIG. 3, in which the control function mediates among four play stations each having four adjacent smart card reader/encoder devices. The system also includes two currency acceptor/disburser mechanisms. A device according to the third embodiment of the invention is designed for use in high traffic areas where league competition and/or ATM usage are expected to be high. Although FIGS. 1–3 refer to two or four play stations, any number of play stations and adjacent smart card and currency handling equipment can be combined along the same organizational schemes—the number of play stations is not critical as long as the present device includes two or more of them.

Figure 4:
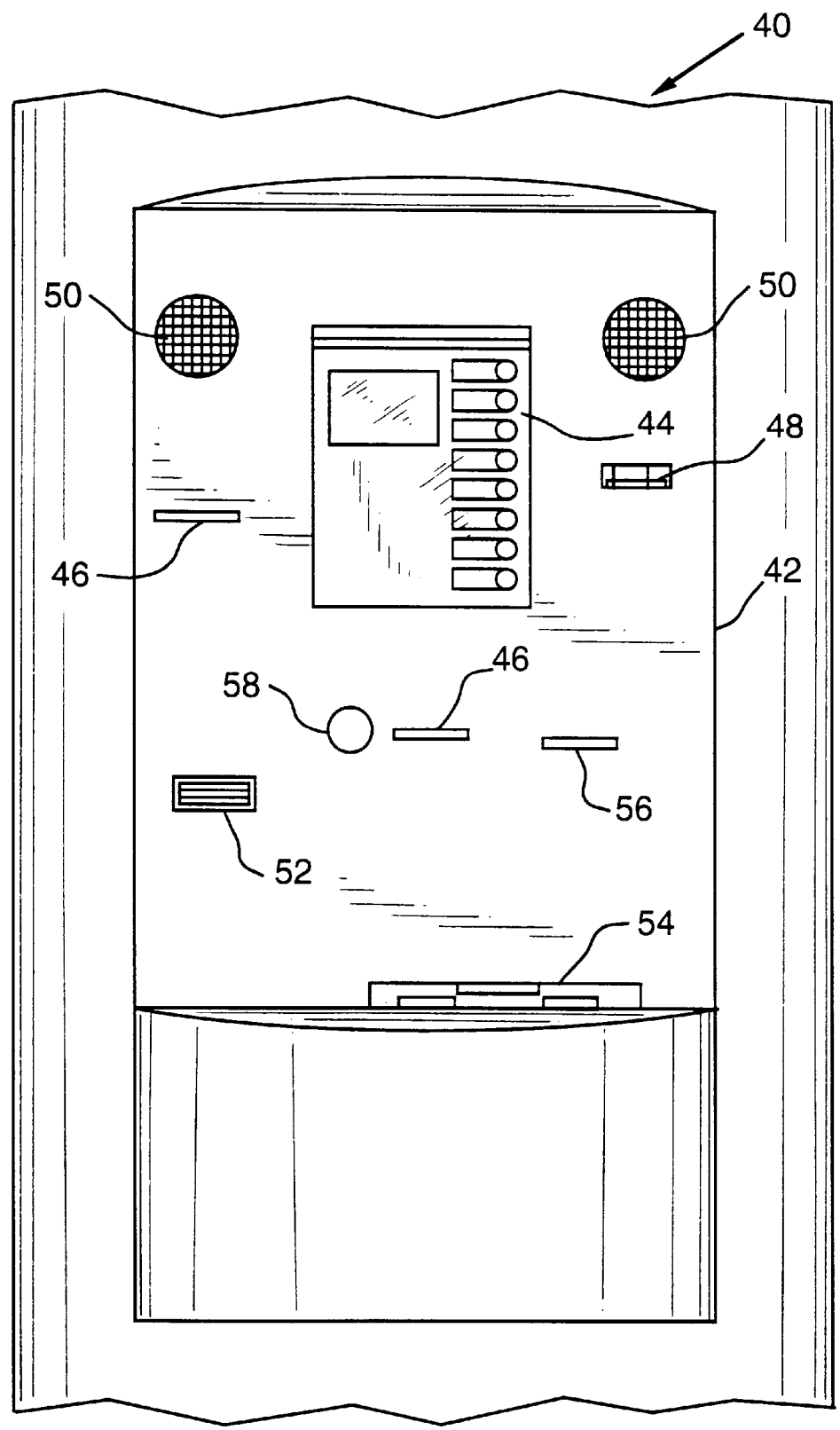
FIG. 4 is a side elevational view of a control panel according to a fourth embodiment of the invention.
Figure 5:
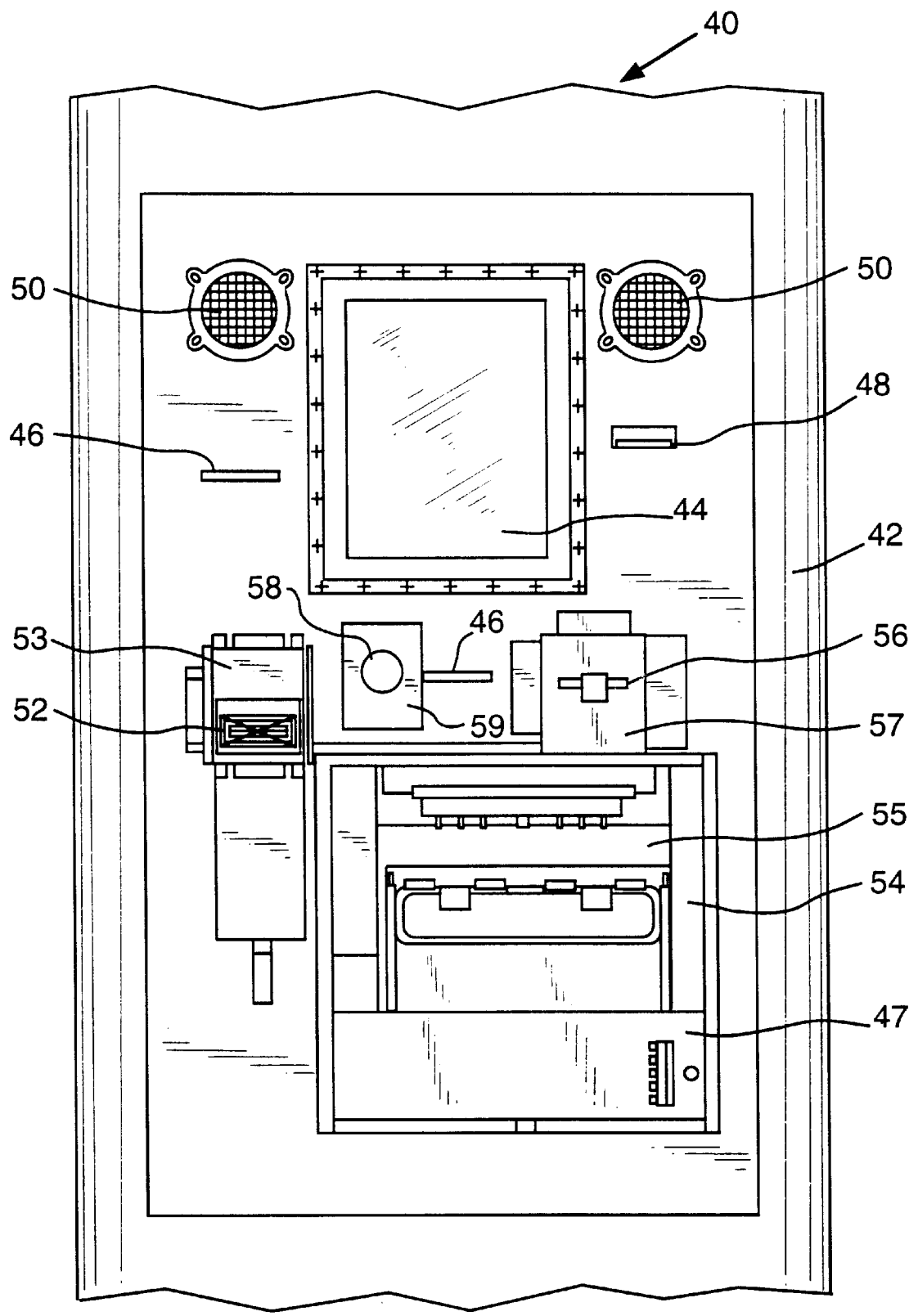
FIG. 5 is a side elevational view of the same mechanics as shown in FIG. 4, but with the control panel removed.

Despite the practical and commercial appeal of separate provision of play stations and ATM(s), the present invention also embraces the direct combination of one or more play stations with direct cash acceptance and disbursement functions, as shown in FIGS. 4 and 5. Referring now to FIG. 4, a partial side elevational view of a fourth embodiment of the present device is shown, in which a kiosk 40 includes a control panel 42 having a video command touchscreen 44, at least one smart card dispenser 46, a credit card reader 48, stereo speakers 50, a bill (cash) acceptor 52, a bill dispenser 54 and a receipt (printer) dispenser 56. Optionally, one of the smart card dispensers 46 may be recording means for encoding information on media other than smart cards, including but not limited to magnetic recording tape; floppy or removable hard disks or drives; recordable CDS, PC cards or PCMCIA cards and etc. A motion/sound/position sensor 58 is also provided adjacent the video command touchscreen. A player using the control panel 42 thus has all device functions available to him or her in a single location. Entry fees may be paid with credit card, smart card value or cash (or even coin, coin acceptor not shown). Games of skill may be played entirely using the video command touchscreen 44 (although there is no reason why manual controls such as appear in FIG. 1 may not be incorporated in the control panel 42). Winnings, if any, may be collected as smart card credits or cash or may even be directed to remote credit locations via the video command touchscreen, if the control feature of the device provides such an option. Video touchscreen commands may activate a juke box internal to the kiosk 40 to play music through the stereo speakers 50 either separate from or in conjunction with game play.

FIG. 5 illustrates the control panel 42 of FIG. 4 with its cover removed, exposing the underlying mechanical features. A bill dispenser security safe 55 and associated vending hardware is thus positioned adjacent the bill dispenser 54. A bill acceptor mechanism 53 known in the art supports the bill acceptor 52 shown in FIG. 4. A smart card safe 47 contains smart card inventory to supply to the smart card dispenser(s) 46. A motion/sound/position device 59 supports the sensor 58. A printer 57 provides receipts or other printed material to the receipt (printer) dispenser 56. Each individual mechanism illustrated in FIGS. 4 and 5 is known in the art, and the invention combines a number of them in a novel way to achieve a heretofore un-dreamed-of sport league device of almost inestimable ingenuity and consumer appeal.

It is not necessary for a kiosk, such as that shown in FIG. 1, actually to include a mechanical skill game therein. A kiosk may simply include a video game of skill via one or more control panels 42 according to FIG. 4, or variations thereof as described above. Alternatively, the control panels 42 may be provided as wall mounted stations without a free standing kiosk at all.

Figure 6:
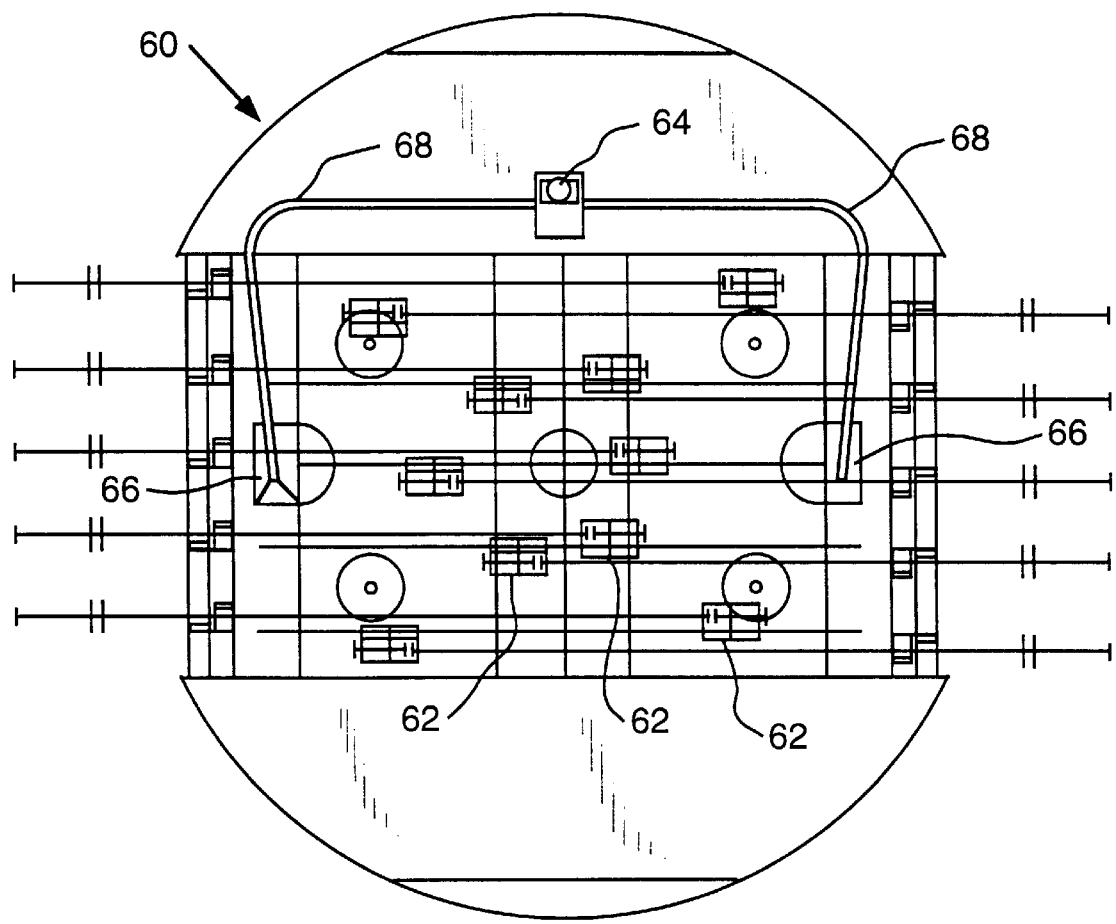
FIG. 6 is a plan view of the game playing field shown in FIG. 1.

Other mechanisms included in the present device but not necessarily novel thereto are the games of skill themselves. FIG. 6 provides a plan view of an exemplary playing field for miniature hockey, for inclusion in for example the invention shown in FIG. 1, in which the playing field 60 contains a plurality of player gearbox mechanisms 62 for controlling a plurality of electromechanical teamsmen (not shown). Play is conducted by causing the teamsmen mechanically to strike a puck dropped from a puck ejector 64 competitively to score one or more goals into the nets 66, from which the pucks are automatically retrieved by puck tracks 68 back into the puck ejector 64. Computerized control of such a playing field thus requires only addition of counting sensors to the nets 66, to keep track of and to communicate the number of goals scored by each player.

Figure 7:
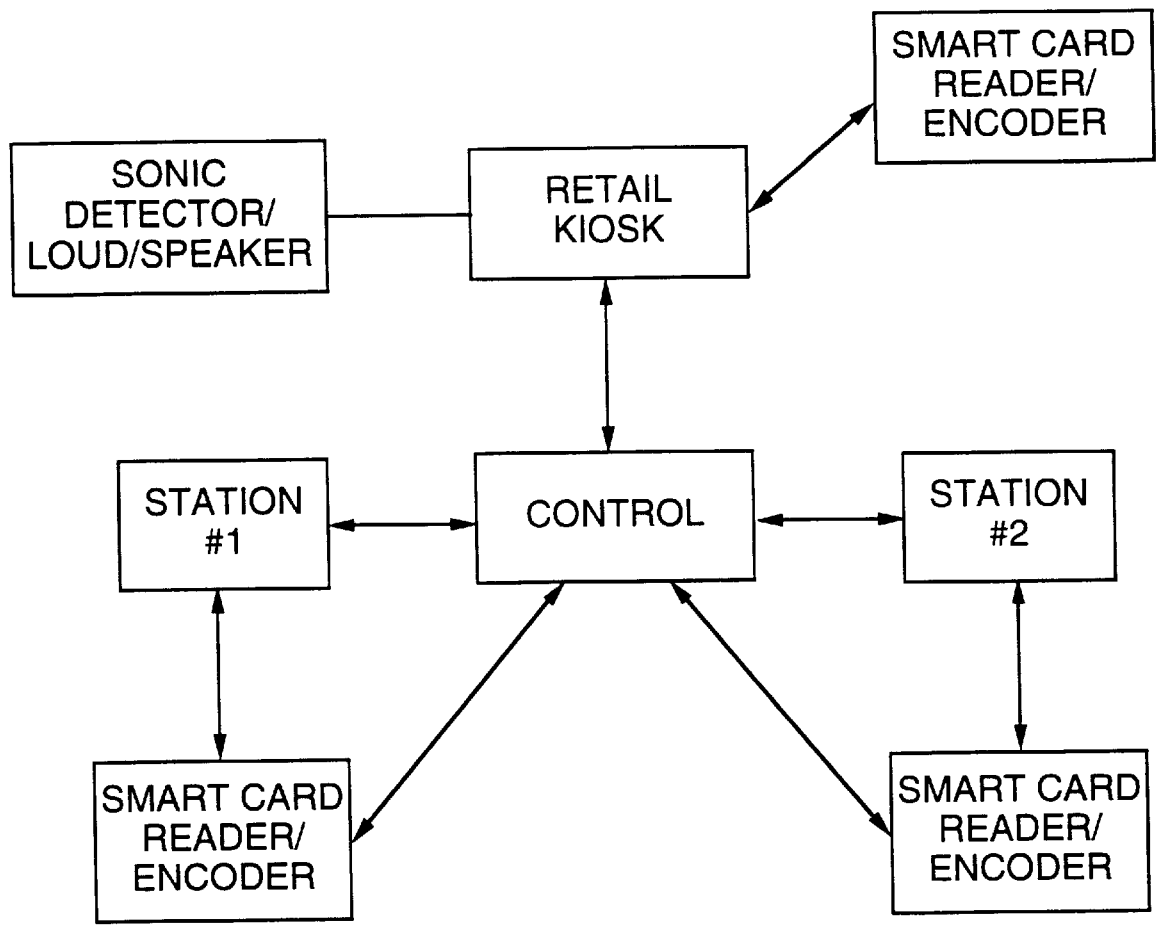
FIG. 7 is a schematic diagram of a fifth embodiment of the invention.

A fifth embodiment of the invention is shown in the schematic diagram of FIG. 7. The fifth embodiment differs from the third embodiment in two primary ways: a complete retail kiosk is incorporated into the device instead of simply one or more currency acceptor/disburser means, and sonic detector/loud speaker means provide a number of functions including an "attract" mode to advertise the retail kiosk as well as the game stations. The retail kiosk may be designed for literally any direct or remote vending as discussed earlier in this specification, and may provide endless combinations of point-of-sale purchases including passport application with on-site photography, international phone card dispensing with simultaneous ticket and travel services, accommodations, confirmations and execution of immediate e-mail and facsimile communications with simultaneous customized vending of postcards or personalized aerograms (with or without prepaid postage) for later travel use.

Figure 8:
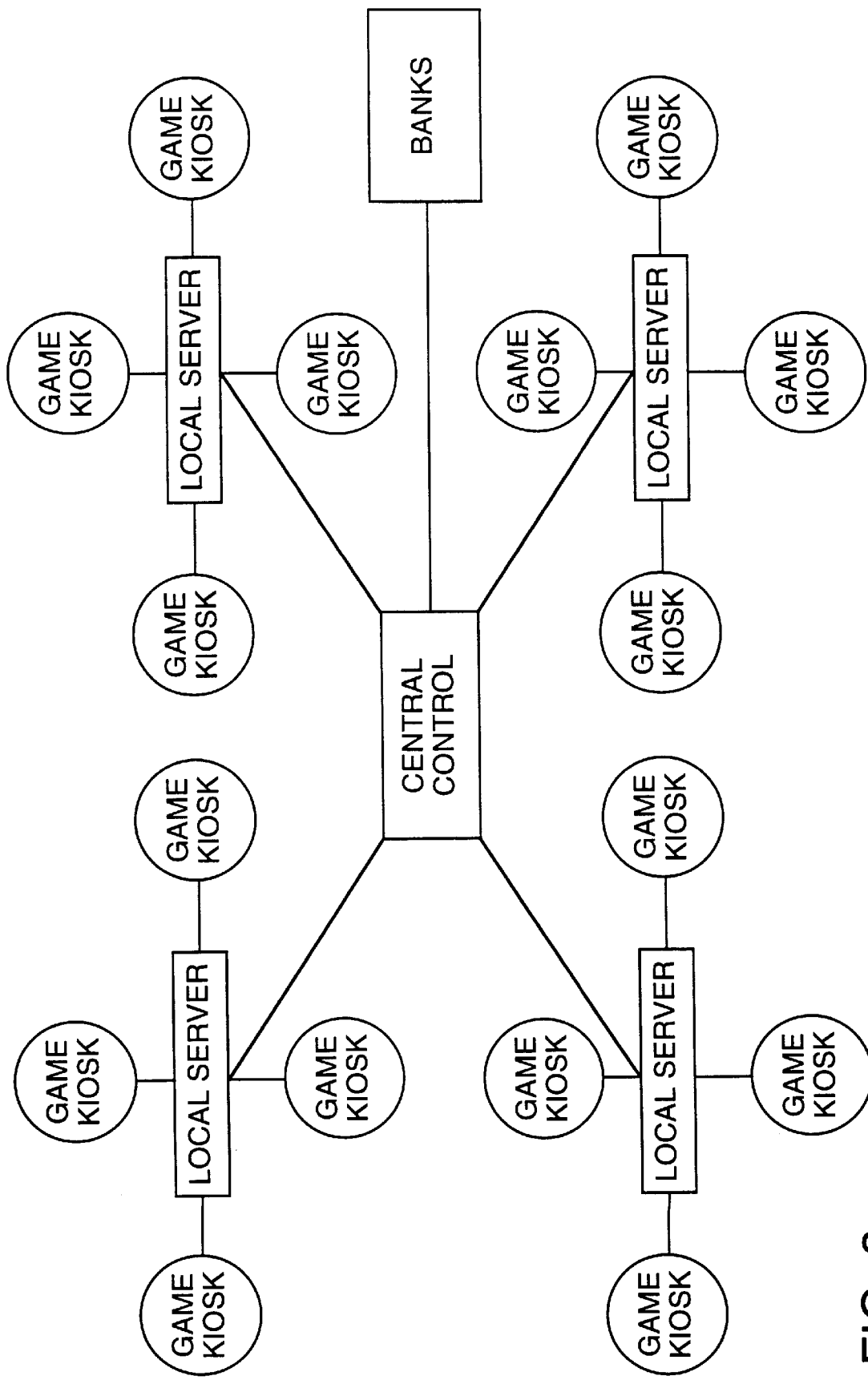
FIG. 8 is a schematic diagram of a sixth embodiment of the invention.

In the device as illustrated in FIGS. 1–7, the control equipment is generally provided from within a single game site or kiosk, but this is not necessary to the present invention and is not really even preferable. In fact, the most preferred embodiments of the present device are those which accommodate full scale league competitions, and so have at least LAN if not WAN configurations. Referring now to FIG. 8, a WAN configuration of the present device is shown in schematic diagram wherein the WAN includes central control of a system of LANs controlled by local servers (according to the computer client/server model). A plurality of game kiosks, such as those shown in other Figures herewith, are controlled by each server, and all servers can be coordinated to administer league play. Network connection with banks, financial institutions and general retail goods and services providers is represented by the box labeled "BANKS." With the system illustrated in FIG. 8, skill game or sport league devices according to the invention can administer tournaments throughout a single city, throughout several separate geographic locations or—quite easily—throughout the world.

For the purpose of FIG. 8, "game kiosk" should be understood to mean any terminal or play station capable of network interconnection with the disclosed system, some of which may not resemble the subject matter of FIG. 1 at all. For example, home participants using a PC or a machine manufactured by companies such as SEGA or NINTENDO may be added to the network with or without a smart card peripheral device therewith.

It is apparent from the above that the inventive concept is susceptible of wide variation without departure from the essential invention as described herewith. For this reason, the invention is only to be considered limited insofar as is set forth in the accompanying claims.

We claim:

1. A league device, comprising: game means wherein means are provided for play by at least one player, and at least one opponent, of a game of skill, said game means being positioned adjacent a means for accepting and immediately and automatically disbursing currency wherein said game means and said means for accepting and disbursing currency further contain means to enable independent or simultaneous operation of said game means and said means for accepting and disbursing currency.

2. A league device comprising: a game wherein play controls are provided for play by at least two players of a game of skill; a computerized control in communication with said game; and an automated teller function for accepting and disbursing currency in communication with said computerized control, wherein said game is substantially housed by a kiosk, wherein said computerized control engages one of a local area network and a wide area network; whereby administration of league play of two or more players of a game of skill is conducted automatically including acceptance of entry fees and disbursement of any winnings.

3. The league device according to claim 2 wherein said kiosk houses an automated teller machine.

4. The league device according to claim 2 wherein the device includes at least two kiosks each of which substantially houses at least one of said game, wherein said computerized control engages a wide area network.

5. The league device according to claim 2 wherein said kiosk also contains a juke box and at least one control therefor.

6. The league device according to claim 2 wherein said kiosk further houses services for one of electromechanical games of skill services; smart card services; insurance services; restaurant services; travel services; sports services; gaming device services; delivery services; coupon services; introduction services; audio services; news services transportation services; utility services; physician services; school services; security services; building services; credit services; directory services; home services; military services; personal services; automotive services; employment services; recreational services; travelers check services; children's services; video games of skill services; Internet services; brokerage services; government services; entertainment services; library services; catalogue services; print services; diagnostic services; chat services; video services; database services; barter services; engineering services; pharmacy services; identification services; detective services; church services; loan services; training services; buying services; recruitment services; accounting services; photographic services; food services; radio services; credit services; theme park services; music services; financial services; full-line vending services; health care services; remote access services; payment services; computer services; search services; network services; subscription services; virtual reality services; advertising services; rental services; programming services; beverage services; credit/debit card services; freight services; stored value card services; beauty services; tax services; leasing services; medical services; emergency services; publishing services; counseling services; satellite services; screening services; real estate services; telephone services; ticket services; television services; dating services; information services; lottery services; software services; reservation services; communication services; Intranet services; adult services; referral services; repair services; legal services; consulting services; maintenance services; moving services; trade show services; design services; lodging services; mail services; fast food services; automated services; recording services; clothing services; wireless services; human services; and encryption services.

7. A league device comprising: a kiosk containing game means, control means and means for accepting and disbursing currency, said game means providing for play by at least two players of a game of skill further comprising at least two play stations and at least one network connection between said at least two play stations; said control means having capability of controlling said game means; and means for accepting and disbursing currency in communication with said control means wherein said means for accepting and disbursing currency accepts and dispenses currency selected from the group consisting of actual cash and digital currency, whereby administration of league play of two or more players of a game of skill is conducted automatically including acceptance of entry fees and immediate disbursement of winnings as currency selected from the group consisting of actual cash and digital currency.

8. The league device according to claim 7 wherein said game means further includes at least one video screen to facilitate user control of said game means.

9. The league device according to claim 7 wherein said game means further includes at least one video screen configured both to facilitate user control of said game means and to control at least one additional retail transaction means present in association with said game means.

10. The league device according to claim 7 wherein said means for accepting and disbursing currency further comprises in combination a bill acceptor, a bill dispenser, and credit card reader and a smart card reader.

11. The league device according to claim 7 wherein said game means includes at least one video control screen, at least one card reader/encoder and at least one audio speaker.

12. The league device according to claim 9 wherein said additional retail transaction means is a juke box.

13. The league device according to claim 9 wherein said additional retail transaction means is selected from the group consisting of Skill Services; Smart Card Services; Insurance Services; Restaurant Services; Travel Services; Sports Services; Gaming Device Services; Delivery Services; Coupon Services; Introduction Services; Audio Services; News Services; Transportation Services; Utility Services; Physician Services; School Services; Security Services; Building Services; Credit Services; Directory Services; Home Services; Military Services; Personal Services; Automotive Services; Employment Services; Recreational Services; Travelers Check Services; Kids Services; Videogames of Skill Services; Internet Services; Brokerage Services; Government Services; Entertainment Services; Library Services; Catalog Services; Print Services; Diagnostic Services; Chat Services; Video Services; Database Services; Barter Services; Engineering Services; Pharmacy Services; Identification Services; Detective Services; Church Services; Loan Services; Training Services; Buying Services; Recruitment Services; Accounting Services; Photographic Services; Food Services; Radio Services; Credit Services; Theme Park Services; Music Services; Financial Services; Full-line Vending Services; Health Care Services; Remote Access Services; Payment Services; Computer Services; Search Services; Network Services; Subscription Services; Virtual Reality Services; Advertising Services; Rental Services; Programming Services; Beverage Services; Credit/Debit Card Services; Freight Services; Stored Value Card Services; Beauty Services; Tax Services; Leasing Services; Medical Services; Emergency Services; Publishing Services; Counseling Services; Satellite Services; Screening Services; Real Estate Services; Telephone Services; Ticket Services; Television Services; Dating Services; Information Services; Lottery Services; Software Services; Reservation Services; Communication Services; Intranet Services; Adult Services; Referral Services; Repair Services; Legal Services; Consulting Services; Maintenance Services; Moving Services; Trade Show Services; Design Services; Lodging Services; Mail Services; Fast Food Services; Automated Services; Recording Services; Clothing Services; Wireless Services; Human Services; and Encryption Services.

\* \* \* \* \*